(12) United States Patent
Sassolini et al.

(10) Patent No.: US 7,009,799 B2
(45) Date of Patent: Mar. 7, 2006

(54) TILTABLE DEVICE, IN PARTICULAR HARD DISK ACTUATOR DEVICE, WITH ROLL AND PITCH ANGLE ACTIVE CONTROL

(75) Inventors: Simone Sassolini, Sansepolcro (IT); Benedetto Vigna, Pietrapertosa (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 420 days.

(21) Appl. No.: 10/161,054

(22) Filed: May 30, 2002

(65) Prior Publication Data

US 2003/0002195 A1    Jan. 2, 2003

(30) Foreign Application Priority Data

May 31, 2001   (IT) ........................... TO2001A0519

(51) Int. Cl.
*G11B 5/60*   (2006.01)
*G11B 21/12*  (2006.01)

(52) U.S. Cl. .................. 360/75; 360/78.05; 360/234.6; 360/294.7; 360/245

(58) Field of Classification Search .................. 360/75, 360/60, 69, 77.02, 77.08, 78.05, 234.3, 234.4, 360/234.5, 234.6, 294, 244.1, 244.2, 245, 360/245.1, 245.3, 245.4, 245.5, 245.6, 245.7, 360/245.8, 294.7; 29/603.03; 310/309, 310/314, 323.17; 318/116; 359/198, 199, 359/212, 213, 214, 223, 224, 230
See application file for complete search history.

(56) References Cited

U.S. PATENT DOCUMENTS

| | | | |
|---|---|---|---|
| 5,313,352 A | * | 5/1994 | Chikazawa et al. ........... 360/75 |
| 5,711,063 A | * | 1/1998 | Budde et al. ............ 29/603.06 |
| 5,862,015 A | * | 1/1999 | Evans et al. ................... 360/75 |
| 5,914,801 A | * | 6/1999 | Dhuler et al. ................ 359/230 |
| 6,055,132 A | * | 4/2000 | Arya et al. ............... 360/245.9 |
| 6,181,524 B1 | * | 1/2001 | Tokuyama et al. ........ 360/245.5 |
| 6,181,531 B1 | * | 1/2001 | Koshikawa et al. ...... 360/294.4 |
| 6,201,629 B1 | * | 3/2001 | McClelland et al. ......... 359/223 |
| 6,535,355 B1 | * | 3/2003 | Boutaghou et al. ....... 360/245.7 |
| 6,597,539 B1 | * | 7/2003 | Stupp et al. ............. 360/245.7 |
| 6,600,619 B1 | * | 7/2003 | Morris et al. .................. 360/75 |
| 6,744,173 B1 | * | 6/2004 | Behin et al. ................ 310/309 |
| 6,798,609 B1 | * | 9/2004 | Bonin et al. ............. 360/78.05 |

OTHER PUBLICATIONS

Arkin, M., "Designing Head Positioning Servos: Challenges Ahead," *Data Storage*, pp. 27-36, Oct. 1999.

* cited by examiner

*Primary Examiner*—David Hudspeth
*Assistant Examiner*—James L Habermehl
(74) *Attorney, Agent, or Firm*—Lisa K. Jorgenson; Harold H. Bennett, II; Seed IP Law Group PLLC (57) ABSTRACT

In an actuator device for hard disks a suspension element carries a slider that is subject to undesired vibrations which give rise to rotations of the slider with respect to a nominal position. An electrostatically controlled position-control structure is arranged between the suspension and the slider and is controlled in an active way so as to generate torsions of the platform that counter the undesired rotations. The position-control structure comprises a platform of conductive material and control electrodes arranged underneath the platform. The platform is connected to a load-bearing structure by spring elements that enable movements of roll and pitch. Four control electrodes are arranged according to the quadrants of a square and can be selectively biased for generating electrical forces acting on the platform.

28 Claims, 6 Drawing Sheets

TILTABLE DEVICE, IN PARTICULAR HARD DISK ACTUATOR DEVICE, WITH ROLL AND PITCH ANGLE ACTIVE CONTROL

BACKGROUND OF THE INVENTION

1. Field of the Invention

The present invention relates to a tiltable device, in particular to a hard disk actuator device, with roll and pitch angle active control.

2. Description of the Related Art

As is known, hard disks are the media most widely used for storing data; consequently, very large volumes of hard disks are produced, and the maximum data-storage density continues to increase from one year to the next. Hard disks are read and written using actuator devices, the general structure of which is illustrated in FIGS. 1 and 2 and is described hereinafter.

Figure 1:
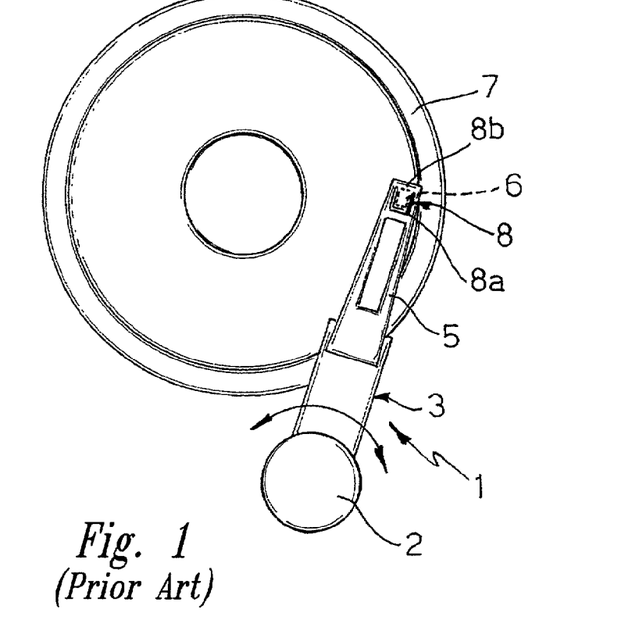
FIG. 1 shows a top plan view of an actuator for hard disks, of a known type.
Figure 2:
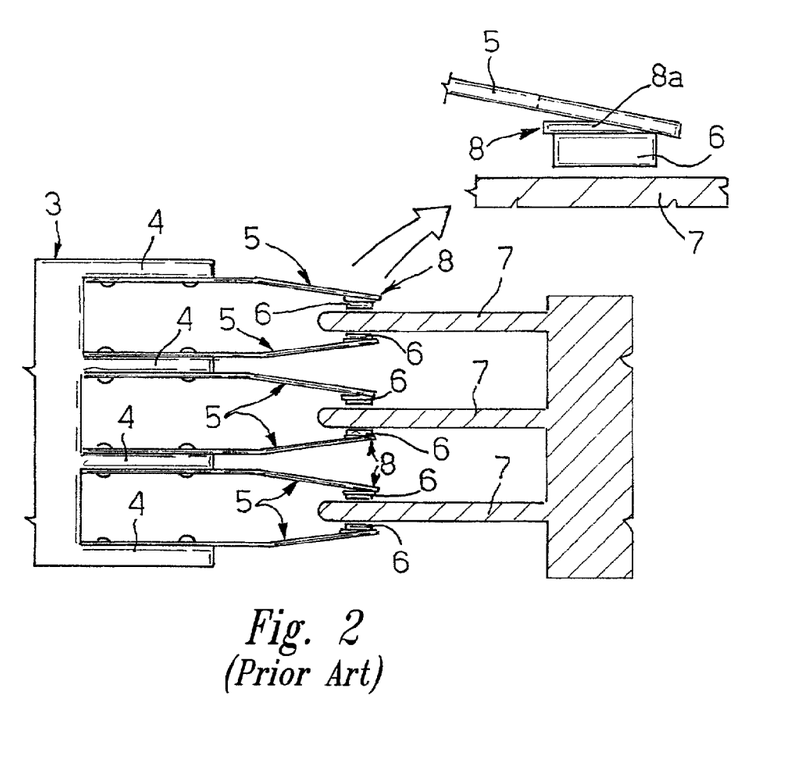
FIG. 2 is an enlarged side view of some parts of the actuator of FIG. 1.

In particular, FIG. 1 shows a known actuator device 1 of rotary type, comprising a motor 2 (also referred to as "voice coil motor") fixed to a supporting body 3, generally referred to as E-block because of its E shape in side view (see FIG. 2). The supporting body 3 has a plurality of arms 4, each of which carries a suspension 5 formed by a lamina or strip fixed in cantilever fashion. Each suspension 5 carries, at its end that is not fixed to the supporting body 3, an R/W transducer 6 for reading/writing, arranged (in operating condition) facing a surface of a hard disk 7 and able to follow the surface of the hard disk 7. For this purpose, the R/W transducer 6 (hereinafter referred to as "slider") is fixed to a joint, called "gimbal" or "flexure" 8, generally formed by the suspension 5 and including, for example, a rectangular plate 8a, cut around three and a half sides from the suspension strip, the connection portion 8b whereof, designed for connection to the suspension 5, enables bending of the plate 8a under the weight of the slider 6.

Since the actuator device 1 is a component of an electromechanical type, it is affected by a series of problems linked to friction, contamination and mechanical stresses, which may impair proper operation thereof, in particular considering the high speed of rotation of hard disks (currently, in the region of 10000 r.p.m.).

In particular, the present invention tackles the problem of vibrations of the suspension. In fact the suspension is, together with the slider, a mechanical system provided with its own vibration modes at well-determined frequencies. Although some of these modes are of little importance for the mechanical system, there are others that may create problems because they disturb reading and writing the disk. For example, certain vibration modes cause an error, referred to as "off-track error" which causes exit of the slider 6 from the longitudinal axis of the track. During writing, this may lead to a loss of data on account of undesired erasure of the adjacent tracks.

Consequently, when the control system associated to the actuator device detects dangerous vibrations of the suspension, it inhibits reading and writing in order to enable resettling of the mechanical system (suspension and slider). This results in dead times, which are incompatible with the high speeds involved and the short data-accessing times required.

BRIEF SUMMARY OF THE INVENTION

An embodiment of the present invention provides an actuator device equipped with a system for offsetting dangerous vibration modes, which will work without interrupting operation of the hard disk.

According to the present invention, a tiltable device, with roll and pitch angle active control is provided.

In an actuator device for hard disks a suspension element carries a slider that is subject to undesired vibrations which give rise to rotations of the slider with respect to a nominal position. An electrostatically controlled position-control structure is arranged between the suspension and the slider and is controlled in an active way so as to generate torsions of the platform that counter the undesired rotations. The position-control structure comprises a platform of conductive material and control electrodes arranged underneath the platform. The platform is connected to a load-bearing structure by spring elements that enable movements of roll and pitch. Four control electrodes are arranged according to the quadrants of a square and can be selectively biased for generating electrical forces acting on the platform.

Another embodiment of the invention provides a method of operation of the device, including detecting a deviation of the read/write head of a disk drive from a plane parallel to the plane of the hard disk;

rotating the read/write head on first and second axes, perpendicular to each other and coplanar with the read/write head, in a direction opposite the direction of deviation, to return the head to a plane parallel with the plane of the hard disk.

BRIEF DESCRIPTION OF THE SEVERAL VIEWS OF THE DRAWINGS

For a better understanding of the present invention, an embodiment of an actuator for hard disks is now described, purely by way of non-limiting example, with reference to the attached drawings, wherein.

DETAILED DESCRIPTION OF THE INVENTION

Figure 3:
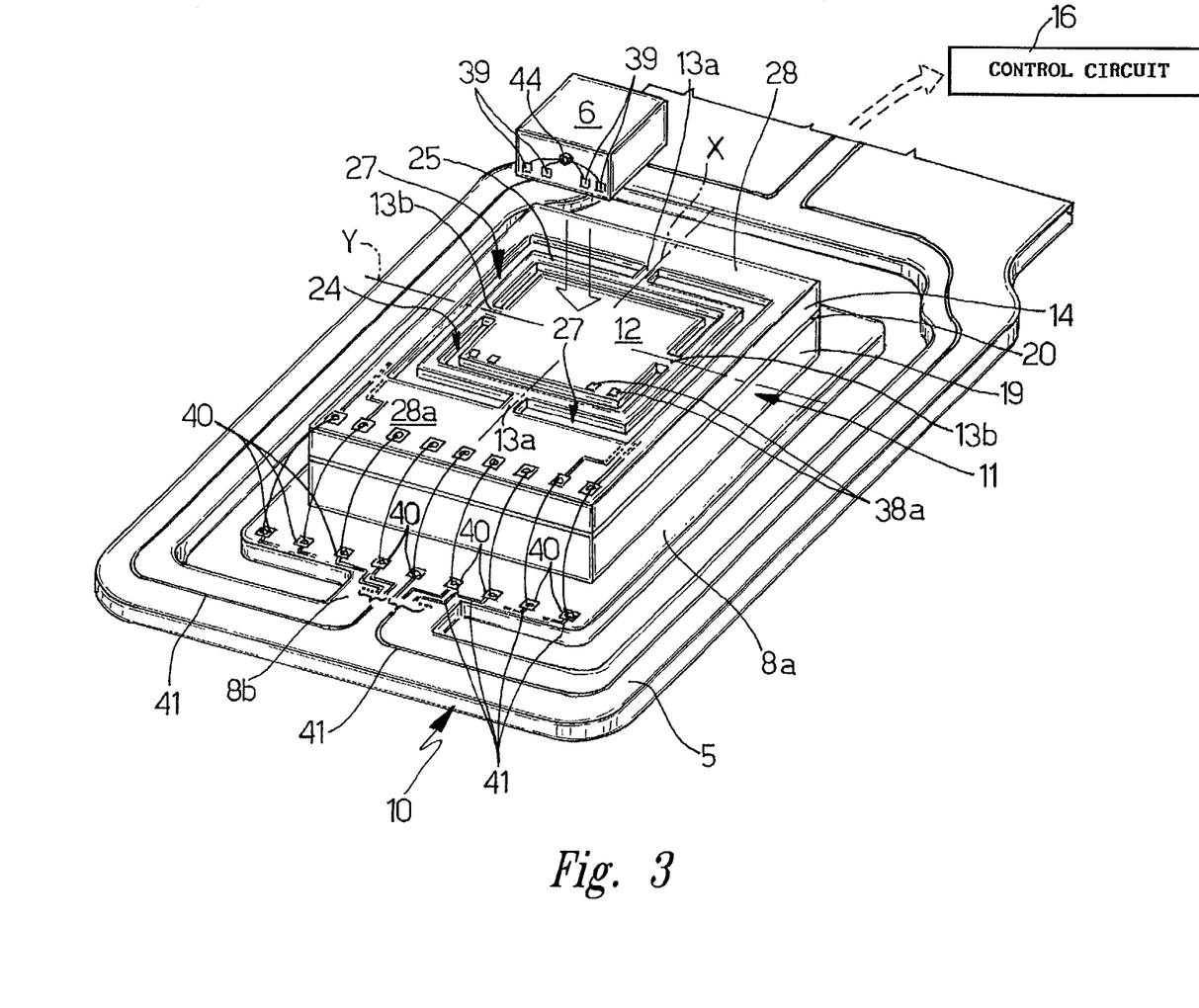
FIG. 3 is a perspective view of the end of a suspension of an actuator according to the invention.

In FIG. 3, an actuator device 10 has the general structure described with reference to FIGS. 1 and 2, and further comprises a platform 12 integrated in a position-control structure 11 arranged between the gimbal 8 and the slider 6. The position-control structure 11 is formed by a chip micromachined according to micromachining techniques used in the micro-electronics industry.

Figure 4:
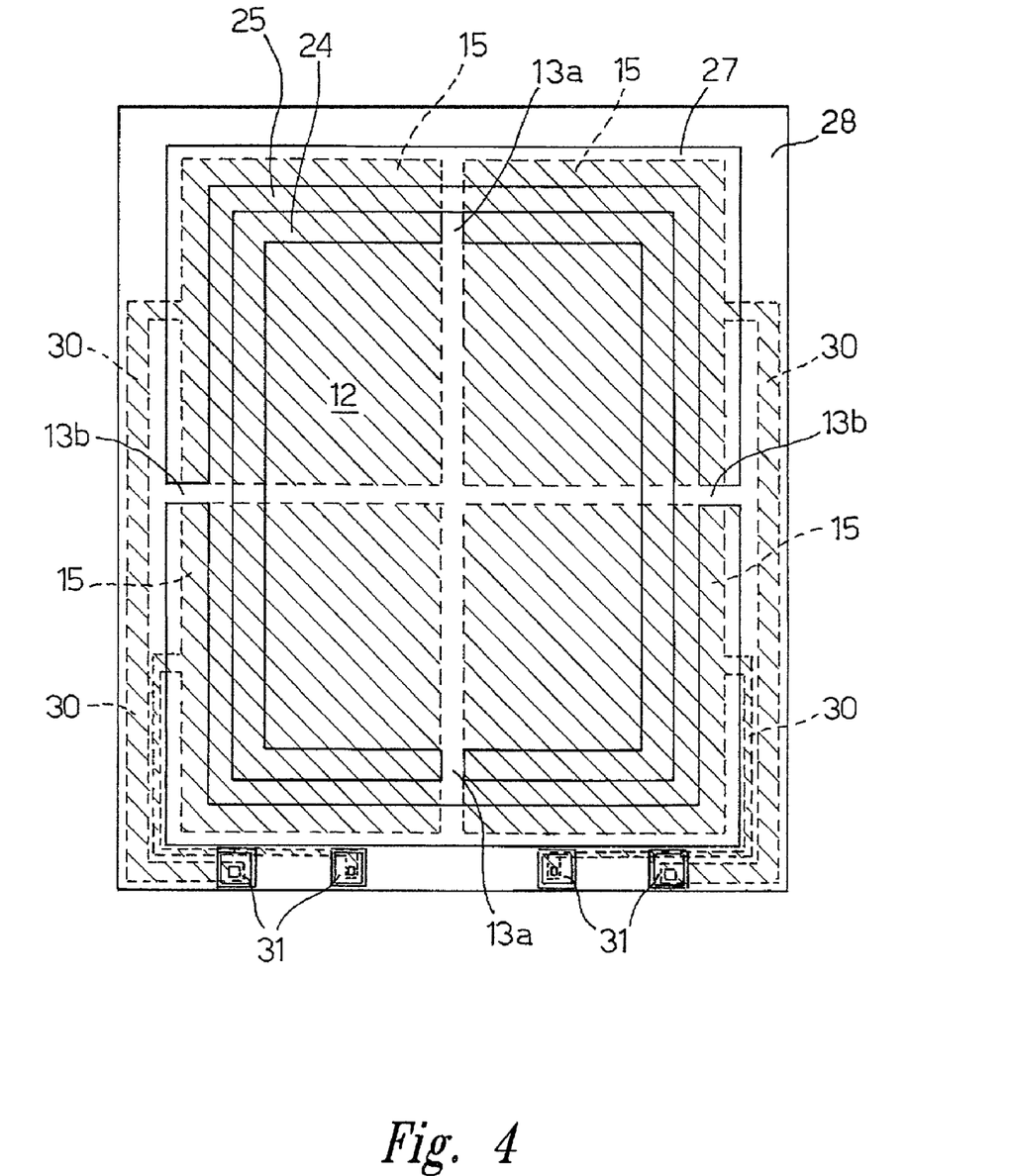
FIG. 4 is a top plan view, with portions removed, of an actuating platform belonging to the actuator according to the invention.
Figure 5:
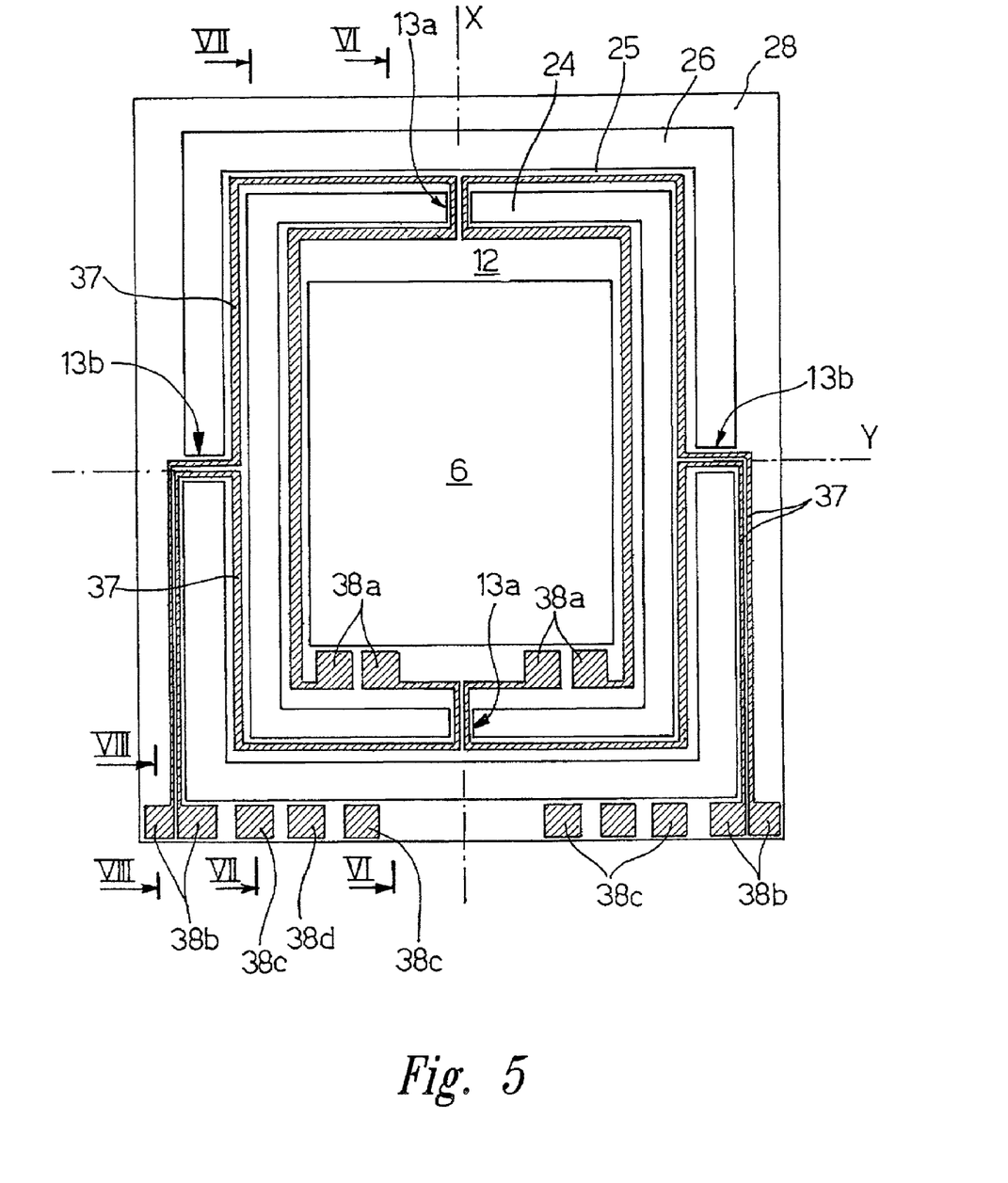
FIG. 5 is a top plan view of the platform of FIG. 4.

The platform 12 is suspended, by suspension arms (also referred to as spring elements) 13a, 13b, to a load-bearing structure 14 and is made to rotate about two orthogonal axes X and Y to roll and pitch. The platform 12, of electrically conductive material or at least provided with conductive regions, is controlled by electrodes 15 (FIG. 4) arranged underneath the platform 12 and selectively biased by a control circuit 16 that forms part of a signal-processing device (not shown) fixed to the motherboard of a personal computer or other apparatus comprising hard disks for data storage, or else directly to the board of the hard disk. The control circuit 16, operating in closed-loop on the basis of information on the position and/or movement of the suspension 5 and represented only schematically in FIG. 3, controls attraction or release of the platform 12 towards or from an electrode 15 or two adjacent electrodes 15, and thus the desired rotation, as explained hereinafter.

As shown in detail in FIGS. 4–8, the platform 12 is formed in a structural layer of doped polycrystalline silicon that extends on top of a substrate 19 of semiconductor material, for example monocrystalline silicon, and is insulated from the latter by an intermediate region 20, of insulating material.

Figure 6:
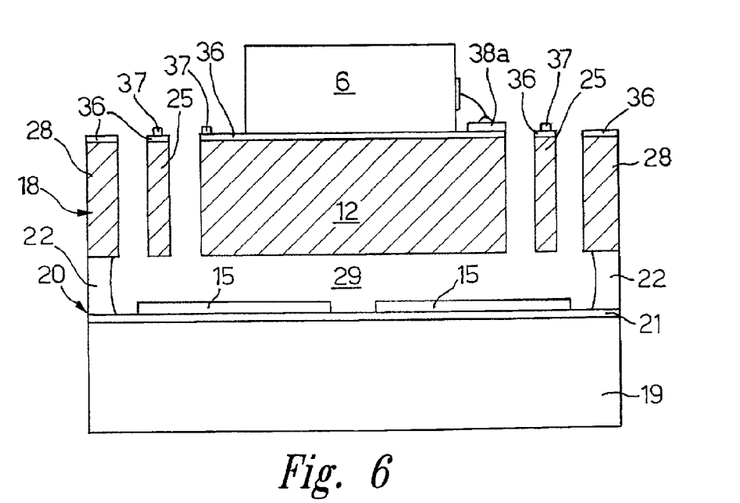
FIG. 6 is a cross-sectional view of the platform of FIG. 5, according to the lines VI—VI.
Figure 7:
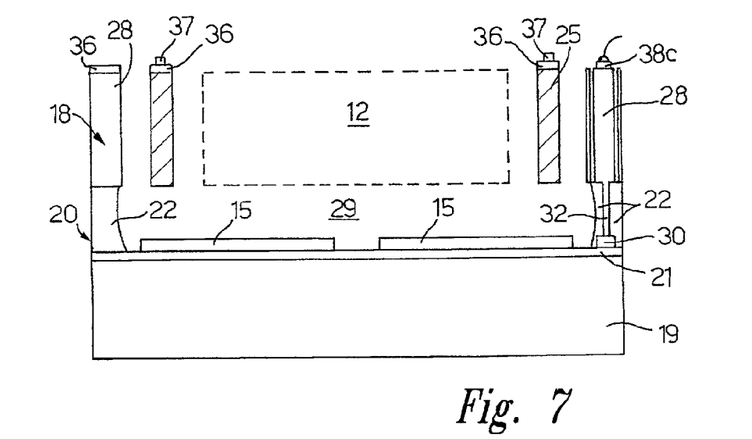
FIG. 7 is a cross-sectional view of the platform of FIG. 5, according to the VII—VII.
Figure 8:
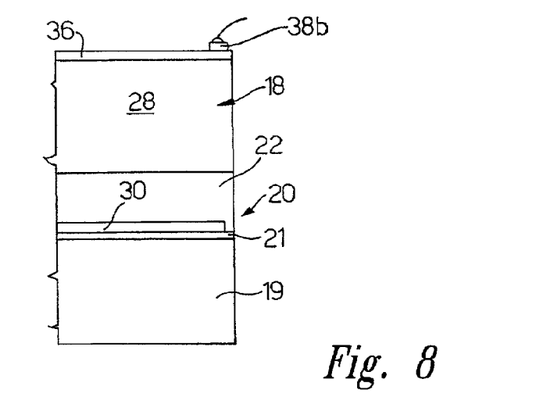
FIG. 8 is a cross-sectional view of the platform of FIG. 5, according to the VIII—VIII.

In detail, as may be better seen from the cross-sectional views of FIGS. 6–8, the intermediate region 20 comprises an insulating layer 21, for example of silicon dioxide, which completely covers the substrate 19, insulating it electrically from the overlying structure, and an insulating region 22, also, for instance, of silicon dioxide. The insulating region 22 extends only on the periphery of the position-control structure 11 on top of the insulating layer 21 and surrounds an air gap 29, obtained by removing a sacrificial layer (which forms also the insulating region 22) so as to enable freeing of the mobile structure and formation of the through electrical connections.

The platform 12 (see in particular FIGS. 3–5) has a rectangular shape, is surrounded by a first trench 24 and is connected to an intermediate frame 25 by a first pair of spring elements 13a that traverse the first trench 24 and extend along the axis X (roll axis). The intermediate frame 25 is surrounded by a second trench 27 and is connected to an outer frame 28 (belonging to the load-bearing structure 14) by a second pair of spring elements 13b that traverse the second trench 27 and extend along the axis Y (pitch axis) perpendicular to the axis X. The second pair of spring elements 13b is thus in phase opposition to the first pair of spring elements 13a.

As may be clearly seen in FIGS. 6–8, the platform 12, the first pair 13a and second pair 13b of spring elements, the intermediate frame 25 and the outer frame 28 are all formed in the same structural layer 18. In addition, as shown in FIGS. 6 and 7, the air gap 29 extends underneath the platform 12, the first and second pairs of spring elements 13a, 13b, and the intermediate frame 25.

The electrodes 15 are formed by regions of doped polycrystalline silicon, on top of the insulating layer 21, below the platform 12, underneath the air gap 29. In particular, as may be seen in FIG. 4, which shows a top plan view of the position-control structure from which the slider 6 and the regions formed on top of the structural layer 18 (and described hereinafter) have been removed, there are four electrodes 15, which have a rectangular shape and are arranged adjacent in pairs, as four quadrants of a square, so as to cover almost entirely the area defined by the platform 12, the first trench 24, the intermediate frame 25, and a big portion of the second trench 27. Each electrode 15 is moreover connected to a respective biasing line 30, also of polycrystalline silicon and extending on top of the insulating layer 21 (FIGS. 7 and 8), underneath the insulating region 22 and the outer frame 28. The biasing lines 30 are connected to through regions 31 (which extend in the outer frame 28 on one side 28a of the latter facing the connection portion 8b of the plate 8a—FIG. 3) through connection portions 32 that pass through the insulating region 22, as shown in detail in FIG. 7. The through regions 31 are electrically insulated from the remainder of the outer frame 28 by trench insulation.

A protective layer 36, for example of silicon dioxide, extends above the platform 12, the pairs of spring elements 13a, 13b, the intermediate frame 25 and the outer frame 28; metal lines 37 and pads 38a, 38b, 38c, 38d are formed on top of the protective layer 36. In detail, four first pads 38a are formed on the platform 12, in proximity of the slider 6, to be connected to corresponding pads 39 (FIG. 3) formed on the slider 6 and electrically connected to a head 44 (magnetoresistive or inductive—not illustrated) which forms a reading and writing device. Four metal lines extend from the four first pads 38a and extend, in pairs, above the first spring elements 13, above the intermediate frame 25, above the second spring elements 13b, and above the outer frame 28 as far as the side 28a of the latter, where the metal lines are connected to respective four second pads 38b.

Moreover four third pads 38c extend on the side 28a of the outer frame 28, above and in direct electrical contact with the through regions 31; to this aim, the protective layer 36 is here removed (FIG. 7). Finally, a fourth pad 38d is in direct electrical contact with the outer frame 28, on the side 28a thereof, for biasing the platform 12 through the outer frame 28. Of course, the protective layer 36 is removed also underneath the fourth pad, similarly to the third pads 38c.

The second pads 38b, third pads 38c and fourth pad 38d are wire-connected to corresponding pads 40 formed on the plate 8a (FIG. 3); electrical-connection lines 41 extend from plate 8a along the suspension 5, as far as the control circuit 16.

In practice, by applying a potential difference between a single electrode 15 or two adjacent electrodes 15 and the platform 12 it is possible to cause the platform 12 to rotate about the axes X and Y. This is shown by way of example in FIGS. 9 and 10, wherein the platform respectively performs a simple rotation about the axis X (that passes through the first spring elements 13a) and about the axis Y (that passes through the spring elements 13b). Of course, also a complex rotation about both the axes is possible.

Figure 9:
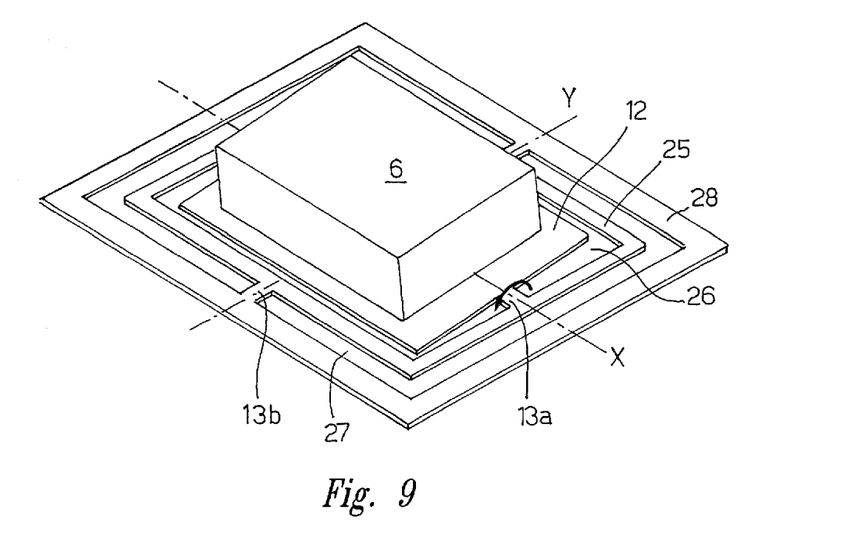
FIG. 9 shows a first torsional mode of the platform according to the invention.
Figure 10:
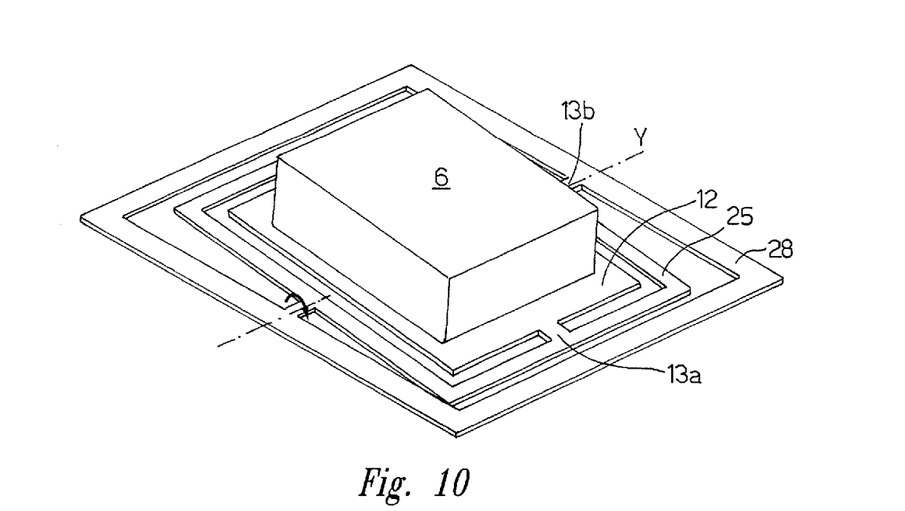
FIG. 10 shows a second torsional mode of the platform according to the invention.

Thereby, by measuring or detecting in a known way the torsions of the suspension 5 (see, for example, Data Storage, October 1999, "Design head positioning servos: Changes ahead"), it is possible to control a contrary and counterphase movement of the platform 12 so as to keep the slider 6 constantly in the correct reading/writing position. FIGS. 9 and 10 show two possible torsional modes of the platform 12, and hence of the slider 6. Thereby, the R/W head 44 can operate continuously, without the need to inhibit reading/writing in order to enable resettlement of the system.

The position-control structure 11 is manufactured as described hereinafter.

Initially, an insulating layer 21, for example a thin-oxide layer, is deposited on top of the substrate 19. Then a polycrystalline silicon layer is deposited for a thickness of, for instance, 450 nm. The polycrystalline silicon layer is defined to form the electrodes 15 and the biasing lines 30. A sacrificial layer (designed to form the insulating region 22), for example of oxide and having a thickness of 2 $\mu$m, is deposited. The sacrificial layer is opened to form vias for electrical connection of the biasing lines 30. An epitaxial layer (structural layer 18) of silicon is grown, possibly after deposition of a silicon germ layer. The epitaxial layer, having a thickness of, for instance, 35 µm, moreover fills the vias, forming the connection portions 32.

Next, the protective layer 36 is deposited and opened above the through regions 31 and where the fourth pad 38d is to be formed. A metal layer is deposited and defined, so as to form the pads 38a–38d and the metal lines 37. A trench etch is then performed for defining the platform 12, the spring elements 13a, 13b, the intermediate frame 25 and outer frame 28. Finally, the second insulating layer, where accessible, is removed through the trenches 24, 27 that have just been formed, thus freeing the mobile structures and forming the air gap 29.

After separating the position-control structure 11 from the similar structures in the same wafer, the slider 6 is bonded, the position-control structure 11 is bonded to the plate 8a, and soldering is carried out for electrical connection between the parts, in a known way.

In the position-control structure 11, the force that causes torsion of the platform 12 and is generated by the electrodes 15 can be calculated according to the following formula:

$$F = 0.5 \, dC/dX \, V^2 \quad (1)$$

where V is the potential difference applied between the selected electrodes and the platform, and dC/dX is the capacitance variation as a function of the gap variation (distance between the electrodes and the platform).

The spring elements 13a, 13b undergo a torsion given by the equation $$\theta = 0.5 \, TL/GJ \quad (2)$$

where T=FB; F is the force applied, given by eq. (1); B is the mean arm on which the force F is exerted, and is equal to the distance between the center of the biased electrode 15 or the centroid of the biased electrodes 15 and the considered spring element 13a, 13b; L is the length of the spring element 13a, 13b; G is the torsion modulus of polycrystalline silicon; and J is the second polar moment of inertia.

Thereby, through the position-control structure 11 and the corresponding control circuitry 16 it is possible to adjust the position of the slider 6 (and hence of the R/W head) in a simple and accurate way, compensating the movements due to the vibration modes of the suspension 5, and thus reducing off-track errors, without entailing any dead times.

The described solution is simple and inexpensive and can be implemented using customary micromachining techniques.

Finally, it is clear that modifications and variations may be made to the device described herein without departing from the scope of the present invention. For example, although the invention has been described with particular reference to the problems of suspensions in actuators for hard disks, it is equally applicable to other situations where the angular position of a body carried by a suspension subject to undesired vibrations is to be electrostatically controlled. In addition, the invention is also applicable to optical-switching devices, where the platform 12 is coated with a metal layer that acts as a reflecting surface (mirror) for light beams and laser beams.

In addition, the position-control structure can be applied also to hard disk actuators with two actuation stages, having a microactuator arranged between the platform 12 and the slider 6, or formed inside the platform 12 and obtained by digging the structural layer 18 so as to define the stator region and rotor region of the microactuator.

In addition, instead of electrically conductive material, the platform 12 may be of insulating material and may carry the conductive regions on its bottom surface or on its sides, for example metal regions that interact with the electrodes 15.

What is claimed is:

1. A tiltable device comprising:
a body subject to undesired vibrations that give rise to roll and pitch movements with respect to a nominal position;
a tiltable platform supported by the body;
a position-control structure arranged between said body and said platform and controlled in an active way to generate torsions of said platform that counter said roll and pitch movements.

2. The device according to claim 1 wherein the device belongs to an actuator for hard disks, and further includes a suspension element having a fixing portion and a load-bearing portion, said fixing portion being fixed to a supporting element, and said load-bearing portion carrying a slider through said position-control structure.

3. The device according to claim 1 wherein said position-control structure is controlled electrostatically.

4. The device according to claim 3, wherein said platform comprises a conductive material portion and is connected to a load-bearing structure through spring elements enabling said platform to perform roll and pitch movements, and wherein said position control structure further comprises control electrodes, said control electrodes facing said conductive material portion and being selectively biasable for generating electrical forces that act on said platform.

5. The device according to claim 4, wherein said platform is integrated in said position-control structure and is of doped semiconductor material.

6. The device according to claim 4, further comprising a control circuit and electrical connections extending from said control circuit to said control electrodes and to said platform for applying a potential difference between said platform and one or more of said control electrodes.

7. The device according to claim 4 wherein said control electrodes comprise four conductive regions extending adjacent in pairs but at a distance, beneath said platform.

8. The device according to claim 4 wherein said control electrodes are of doped semiconductor material.

9. The device according to claim 4 wherein said platform has a polygonal shape surrounded by a first trench and is carried by a first pair of suspension arms aligned to each other in a first direction and extending between said platform and an intermediate frame region; said intermediate frame region being surrounded by a second trench and being carried by a second pair of suspension arms aligned to each other in a second direction, perpendicular to the first direction, and extending between said intermediate frame region and an outer frame region, said platform and said intermediate frame region being separated from said control electrodes by an air gap.

10. The device according to claim 4 wherein said position-control structure comprises a micromachined chip having a substrate of semiconductor material, an intermediate region of insulating material on top of said substrate, and a structural layer extending on top of said intermediate region and defining said platform, said intermediate and outer frames, said intermediate region comprising an insulating layer covering said substrate and an insulating region extending on top of said insulating layer along the periphery of said chip and surrounding laterally an air gap, said control electrodes extending on top of said insulating layer, underneath said air gap.

11. The device of claim 1, further comprising means for detecting the undesired vibrations of the body.

12. A device comprising:
a semiconductor material body;
a position control structure coupled to the body;
a platform coupled to the position control structure;
control means for controlling the position control structure such that the structure moves the platform counter to pitch and roll movements of the body, maintaining thereby a selected position of the platform in spite of the pitch and roll movements.

13. The device of claim 12 wherein the position control structure and the platform are formed in the semiconductor material body.

14. The device of claim 12 wherein the position control structure comprises a gimbal, and wherein the platform is coupled to the gimbal, the gimbal having two axes of rotation, perpendicular to each other and parallel to a plane of a lower surface of the platform.

15. The device of claim 14 wherein the lower surface of the platform generally faces, but does not contact, an upper surface of the semiconductor material body.

16. The device of claim 15 wherein the control means includes a conductive region on the lower surface of the platform generally opposite an electrode on the upper surface of the semiconductor material body, the conductive region and the electrode configured to attract or repel each other, thereby rotating the platform on one of the axes of the gimbal as necessary to counter the pitch and roll of the body.

17. The device of claim 16 wherein the electrode is one of a plurality of electrodes positioned on the upper surface of the semiconductor material body, each configured to attract or repel the conductive region independently of the others of the plurality of electrodes.

18. The device of claim 12, further comprising a read/write head coupled to an upper surface of the platform.

19. The device of claim 18, comprising a hard disk drive, including:
an actuator;
a supporting body coupled to the actuator and motivated thereby;
a suspension arm having at a first end coupled to the supporting body and a second end coupled to and supporting the semiconductor material body; and
a hard disk positioned such that the read/write head is maintained in close proximity to a surface thereof.

20. A method comprising:
detecting a deviation of a read/write head of a disk drive from a plane parallel to a plane of a hard disk, due to vibration in a support structure of the read/write head;
rotating the read/write head on first and second axes, perpendicular to each other and coplanar with the read/write head, in a direction opposite the direction of deviation, to return the head to a plane parallel with the plane of the hard disk.

21. A method comprising:
detecting a deviation of a read/write head of a disk drive from a plane parallel to a plane of a hard disk;
rotating the read/write head on first and second axes, perpendicular to each other and coplanar with the read/write head, in a direction opposite the direction of deviation, to return the head to a plane parallel with the plane of the hard disk; and
wherein:
the read/write head is affixed to a first surface of a platform having a conductive layer on a second surface thereof;
the platform is coupled via a gimbal to a support structure;
the support structure includes an electrode on a surface generally facing to second surface of the platform; and
the rotating step comprises applying a first voltage potential to the conductive layer and a second voltage potential to the electrode.

22. The method of claim 21, wherein the first and second voltage potentials have the same polarity.

23. The method of claim 21 wherein the first and second potentials have opposite polarities.

24. A device, comprising:
a read/write head suspension, including a support platform;
a read/write head coupled to the support platform;
means for detecting torsions of the suspension; and
a control circuit configured to impart movement to the read/write head in counterphase to movement of the platform during a read/write operation of the read/write head.

25. The device of claim 24, further comprising a position control structure coupled to the support platform, with the read/write head coupled to the position control structure, the position control structure configured to receive control signals from the control circuit for controlling a position of the read/write head.

26. A device, comprising:
a read/write head suspension, including a support platform;
a read/write head coupled to the support platform;
means for detecting vibration in the suspension; and
a control circuit configured to impart movement to the read/write head in counterphase to movement of the platform during a read/write operation of the read/write head.

27. A method, comprising:
initiating a read/write sequence of a disk drive head;
detecting a vibration of a support structure of the read/write head; and
imparting, during the read/write sequence, movement to the read/write head in counterphase to the detected vibration, including imparting rotation about x and y axes to the read/write head.

28. The method of claim 27, comprising holding the read/write head on a longitudinal axis of a data track of a hard disk, the imparting step being comprised by the holding step.

* * * * *